No. 894,224. PATENTED JULY 28, 1908.
S. OLOP.
MACHINE FOR GRINDING MEAT, &c.
APPLICATION FILED FEB. 18, 1908.
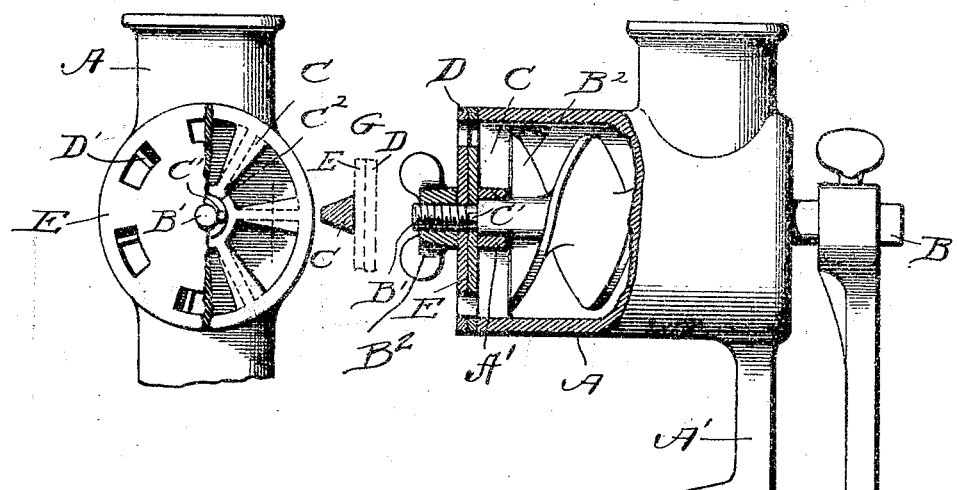
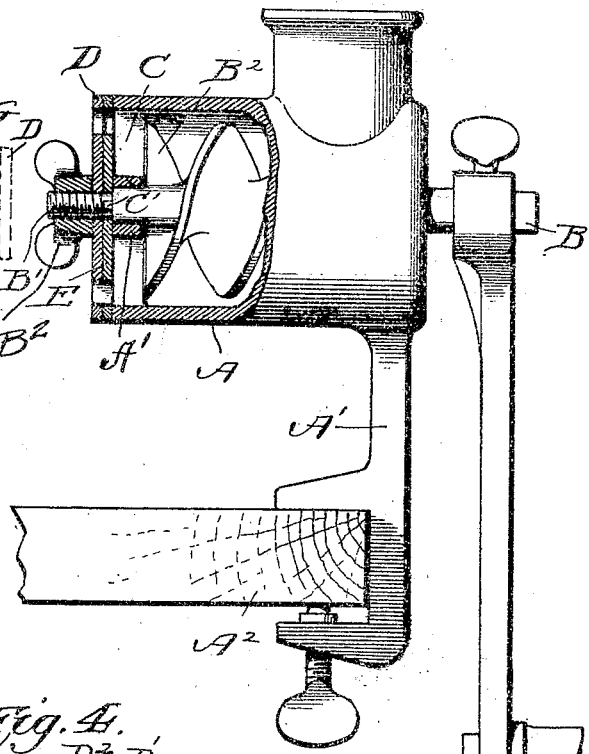
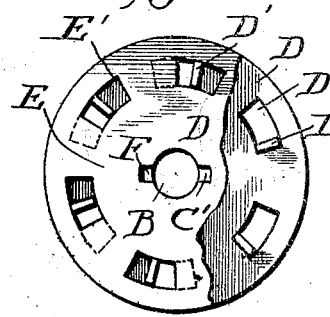
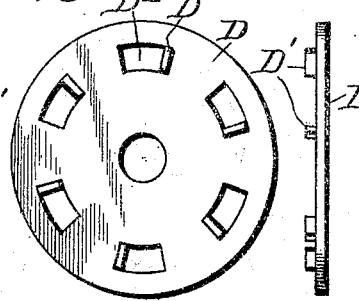
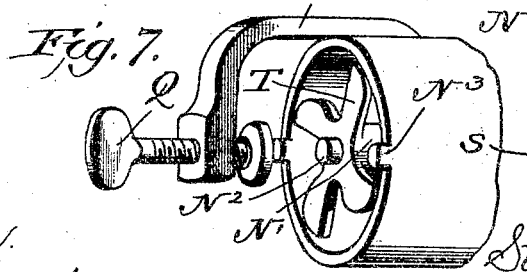
Witnesses
Inventor
Stephen Olop,
By Franklin N. Hough,
his atty.

UNITED STATES PATENT OFFICE.

STEPHEN OLOP, OF WASHINGTON, DISTRICT OF COLUMBIA.

MACHINE FOR GRINDING MEAT, &c.

No. 894,224.   Specification of Letters Patent.   Patented July 28, 1908.

Application filed February 18, 1908. Serial No. 416,511.

*To all whom it may concern:*

Be it known that I, STEPHEN OLOP, a citizen of the United States, residing at Washington, District of Columbia, have invented certain new and useful Improvements in Machines for Grinding Meat, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in meat grinders, and the object in view is to produce a simple and efficient apparatus of this nature, whereby the sizes of the apertures, through which the meat is forced as it is cut, may be regulated and comprises essentially two disk plates, one of which is provided with a series of curved slots, and the other a series of struck-up projections having an adjustment within the slots of the other plate, and forming cutting edges which are flush with the plate through which the projections pass.

The invention comprises various details of construction, combinations and arrangement of parts which will be fully described and then specifically defined in the appended claims.

I illustrate my invention in the accompanying drawings in which:—

Figure 1 is a side elevation of a meat grinder showing my invention as applied thereto, parts being shown in section to better illustrate the details of the invention. Fig. 2 is an inner view showing the arrangement of the disks, parts of the apparatus being removed. Fig. 3 is a detail plan view showing two of the disks adjusted together. Fig. 4 is a detail view of the disk having the struck-up lugs forming cutting edges. Fig. 5 is an edge view of the form shown in Fig. 4. Fig. 6 is an enlarged detail in side elevation, showing the manner of holding the disks upon the grinder shaft. Fig. 7 is a view in perspective of a slight modification of the invention in which the disks are designed to be held stationary, and Fig. 8 is a detail perspective of a portion of one of the disks designed to be used with the modified form.

Reference now being had to the details of the drawings by letter, A designates an ordinary meat grinder having a bracket arm A' for attachment to any object, such as a table $A^2$, to which it is clamped. Mounted in suitable bearings within said grinder one of the bearings being an aperture in the closed end of the grinder casing and the other in the apertured spider A' at the opposite end of the latter, is a shaft B having the feed screw $B^2$ integral therewith. Lugs C' project from said shaft at points diametrically opposite each other and at a location adjacent to the inner end of the threaded portion of the shaft.

D and E designate two circular outlined disks, the former of which is provided with a series of curved slots $D^2$ arranged in the arc of the same circle and D' designates a lug struck up at the end of each slot $D^2$. The disk E is provided with a series of elongated slots E' which are curved upon the arc of the same circle and adapted to receive the lugs D' upon the disk D, each of said lugs being of a length equal to the width of the aperture in the plate E through which it passes and the end of each lug is flush with the inner face of the disk E. Said disk E is provided with slots F formed in the marginal edge of the central opening $E^2$ of the disk E, said slots being provided for the reception of the lugs C', causing the disk to rotate with the shaft. A thumb nut G is mounted upon the threaded portion B' of the shaft B and is adapted to clamp the two disks frictionally against each other, as shown in Fig. 1 of the drawings. It will be noted that, by the construction shown and described, the disks are adapted to rotate with the shaft B and the inner ends of the struck-up lugs D' are flush with the face of the disk E adjacent to the ribs C of the casing, which ribs form cutting edges, which shear with the cutting edges of the disks.

In Fig. 7 of the drawings, I have shown a slight modification of the invention, in which the grinder casing N has the grinder shaft N' mounted therein, one end $N^2$ of said shaft being adapted to have a bearing in the central opening in the disk E, which disk, however, is not shown adjusted in place in the modified form. O designates a bracket arm projecting from the casing N and having a clamping screw Q mounted in the threaded opening in the end thereof, the end of said screw Q being adapted to bear against the outer disk D to hold the same in place upon the casing. In said modified form, the inner disk E is provided with two grooves S formed in the marginal edge thereof at points diametrically opposite for the reception of the lugs N³ formed upon the end of the casing N. Said lugs N³ serve as means to hold the disk E from rotation. A cutting wheel T is provided in the modified form which rotates with the shaft N² and the cutting edges of said wheel are adapted to shear against the marginal edges of the slots in the disk E and the cutting edge of the lugs struck up from the disk D. In the modified form, it will be noted that the disks are stationary, while the cutting edges of the wheel upon the grinder shaft rotate against the cutting edges of the disk.

From the foregoing, it will be noted that, by the provision of a meat grinder as shown and described, means is afforded whereby the two disks without being removed, may have slight relative adjustments accordingly, as it may be desired to regulate the sizes of the apertures through which the meat, after being cut, is forced by the feeding screw of the grinder shaft, thereby regulating the fineness of the cutting of the meat and thus dispensing with the interchangeable disks which are now commonly employed for this purpose and which disks are likely to become misplaced or lost, thereby rendering the ordinary meat grinder practically useless.

What I claim is:—

1. A rotary meat grinder comprising a casing and grinder shaft mounted therein, a disk having lugs struck up from the face thereof forming cutting edges, a second disk provided with slots through which said lugs are designed to pass, the two disks having relative adjustments and held against the end of the grinder casing, as set forth.

2. A rotary meat grinder comprising a casing and grinder shaft mounted therein, a disk having a series of slots formed therein and centrally apertured to receive said shaft with which the disk is adapted to rotate, a second disk centrally apertured to receive said shaft and having a series of lugs struck up therefrom and adapted to extend through the slots in the first mentioned disk, the two disks having relative adjustments, and means for causing the two disks to rotate together, as set forth.

3. A rotary meat grinder comprising a casing and grinder shaft mounted therein, a disk having a series of slots formed therein and centrally apertured to receive said shaft with which the disk is adapted to rotate, lugs projecting from said shaft and engaging slots in the central aperture of said disk, a second disk centrally apertured to receive said shaft and having lugs struck up therefrom and extending through the curved slots in the first mentioned disk, the two disks being relatively adjusted, and means for causing the disks to rotate together, as set forth.

4. A rotary meat grinder comprising a casing and grinder shaft mounted therein, a disk having a series of slots formed therein and centrally apertured to receive said shaft with which the disk is adapted to rotate, a second disk centrally apertured to receive said shaft and having lugs struck up from the face thereof, the ends of said lugs being flush with the inner face of the first mentioned disk, the two disks having relative adjustments, a thumb screw mounted upon said shaft and adapted to hold the disks to rotate together, as set forth.

In testimony whereof I hereunto affix my signature in the presence of two witnesses.

STEPHEN OLOP.

Witnesses:
A. L. HOUGH,
FRANKLIN H. HOUGH.